United States Patent
Vaupotic et al.

(10) Patent No.: US 9,834,122 B2
(45) Date of Patent: Dec. 5, 2017

(54) CUP HOLDER RETAINER INCORPORATING AN INTEGRAL PRELOADED RETAINER CLIP

(71) Applicant: FORD GLOBAL TECHNOLOGIES, LLC, Dearborn, MI (US)

(72) Inventors: Justin Vaupotic, Cheltenham (AU); Ian Woodward, Monbulk (AU); Michael Neumann, Gisborne (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/847,167

(22) Filed: Sep. 8, 2015

(65) Prior Publication Data

US 2017/0066358 A1    Mar. 9, 2017

(51) Int. Cl.
| | | |
|---|---|---|
| *A47K 1/08* | (2006.01) | |
| *B60N 3/10* | (2006.01) | |
| *A47G 23/02* | (2006.01) | |
| *B29C 31/00* | (2006.01) | |
| *F16B 2/20* | (2006.01) | |
| *B29L 31/30* | (2006.01) | |

(52) U.S. Cl.
CPC ........... *B60N 3/10* (2013.01); *A47G 23/0216* (2013.01); *B29C 31/008* (2013.01); *B60N 3/108* (2013.01); *F16B 2/20* (2013.01); *B29L 2031/3005* (2013.01)

(58) Field of Classification Search
CPC ........ B60N 3/106; B60N 3/105; B60N 3/108; B60N 3/10; B60N 3/107; A47G 23/0216; B29C 31/008; B29L 2031/3005

USPC .................... 248/313, 311.2, 316.1
See application file for complete search history.

(56) References Cited

U.S. PATENT DOCUMENTS

| | | | |
|---|---|---|---|
| 4,623,112 A | 11/1986 | Olson | |
| 6,264,153 B1 | 7/2001 | Ragner et al. | |
| 7,543,712 B2 | 6/2009 | Purushothaman | |
| 8,360,380 B2 | 1/2013 | Soma et al. | |
| 8,733,724 B2 | 5/2014 | Voigt et al. | |
| 2004/0021048 A1* | 2/2004 | Schaal .................. | B60N 3/108 248/310 |
| 2005/0184209 A1* | 8/2005 | Dobos ................... | B60N 3/108 248/311.2 |
| 2005/0258201 A1* | 11/2005 | Willows ................ | B65D 25/22 224/148.4 |
| 2006/0076468 A1* | 4/2006 | Shin ....................... | B60N 3/106 248/311.2 |

(Continued)

FOREIGN PATENT DOCUMENTS

| | | |
|---|---|---|
| DE | 202004000618 U1 | 5/2004 |
| DE | 102004008012 A1 | 4/2005 |
| JP | 2011111073 A | 6/2011 |

OTHER PUBLICATIONS

English machine translation of JP2011111073A.
English machine translation of DE102004008012A1.
English machine translation of DE202004000618U1.

*Primary Examiner* — Christopher E Garft
(74) *Attorney, Agent, or Firm* — Vichit Chea; King & Schickli, PLLC

(57) ABSTRACT

A cup holder retainer is provided. The cup holder retainer includes a support frame and a preloaded retainer clip. The preloaded retainer clip is connected to the support frame by a living hinge and an integral biasing element that biases the preloaded retainer clip into a cup-engaging position.

8 Claims, 6 Drawing Sheets

(56) References Cited

U.S. PATENT DOCUMENTS

| | | | | |
|---|---|---|---|---|
| 2006/0118688 A1* | 6/2006 | Kong | .................. | B60N 3/108 |
| | | | | 248/311.2 |
| 2011/0006092 A1* | 1/2011 | Soma | .................. | B60N 3/101 |
| | | | | 224/400 |
| 2011/0127308 A1* | 6/2011 | Ogura | .................. | B60N 3/106 |
| | | | | 224/545 |
| 2011/0297717 A1 | 12/2011 | Kaemmer | | |
| 2014/0158848 A1* | 6/2014 | Caruso | .................. | B60N 3/106 |
| | | | | 248/311.2 |
| 2015/0053834 A1* | 2/2015 | Virgen | .................. | B29C 45/0001 |
| | | | | 248/346.04 |
| 2015/0210211 A1* | 7/2015 | Bozio | .................. | B60N 3/106 |
| | | | | 362/311.01 |

* cited by examiner

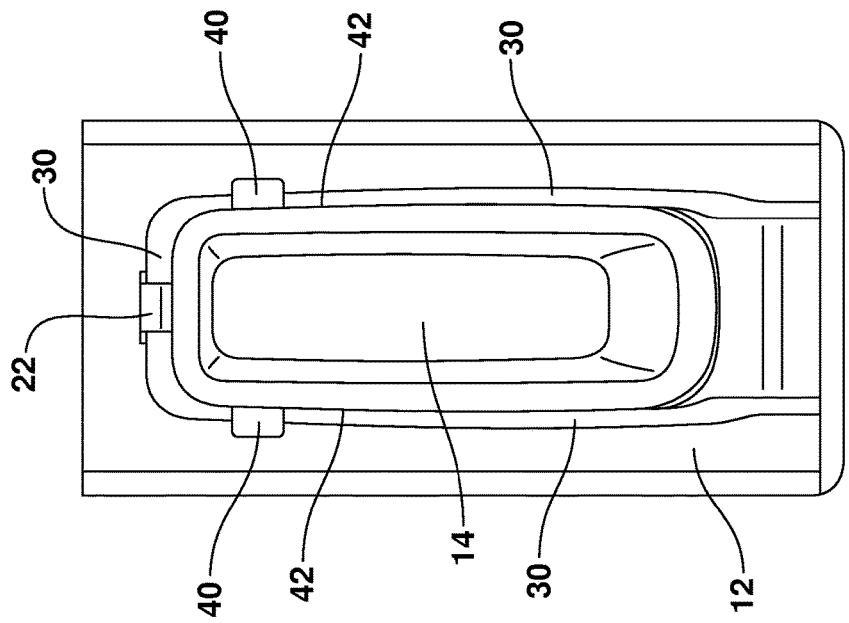
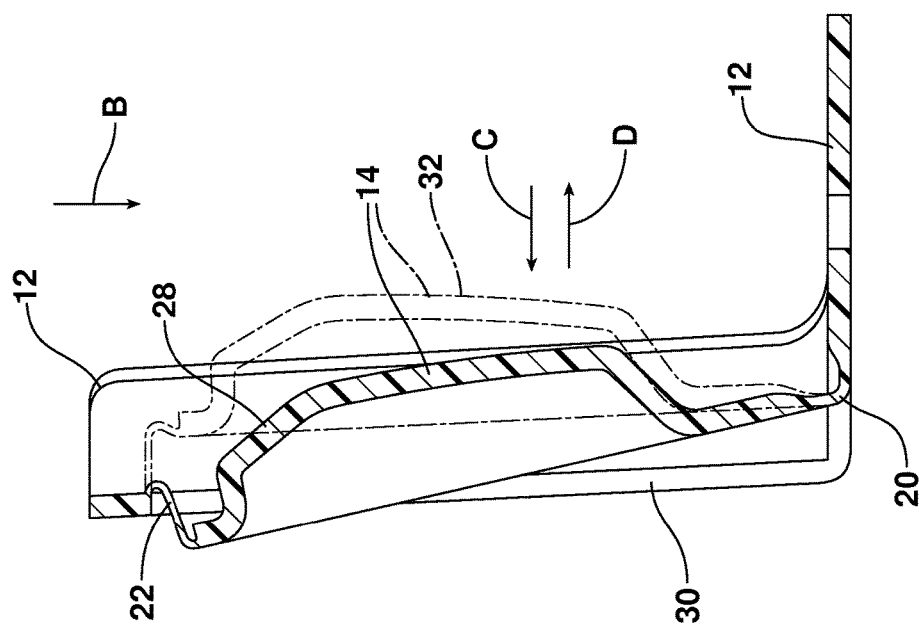

1

CUP HOLDER RETAINER INCORPORATING AN INTEGRAL PRELOADED RETAINER CLIP

TECHNICAL FIELD

This document relates generally to the motor vehicle equipment field and, more particularly, to a cup holder retainer that incorporates an integrated preloaded retainer clip to engage and hold a cup.

BACKGROUND

Cup holders for motor vehicles are well known in the art. One example of such a device is found in U.S. Pat. No. 8,733,724, which is assigned to Ford Global Technologies, LLC.

This document relates to a cup holder retainer that incorporates an integral, preloaded retainer clip. Such a cup holder retainer provides a number of benefits and advantages. These include a reduction in parts and lower manufacturing and assembly costs while providing reliable operation over a long service life.

SUMMARY

In accordance with the purposes and benefits described herein, a cup holder retainer is provided. That cup holder retainer comprises a support frame and a preloaded retainer clip connected to the support frame by a living hinge and an integral biasing element that biases the preloaded retainer clip into a cup-engaging position. The support frame and the preloaded retainer clip are part of a unitary body. In one possible embodiment, that body is made from acetal homopolymer.

In one possible embodiment, the preloaded retainer clip includes a longitudinal axis extending from the living hinge at a first end to the integral biasing element at a second end.

In one possible embodiment, the integral biasing element is formed in an L-shape. The L-shaped integral biasing element includes a first leg and a second leg, where the first leg is longer than the second leg. Further, the first leg is connected to the support frame while the second leg is connected to the preloaded retainer clip.

In yet another possible embodiment, the preloaded retainer clip includes a beveled face adapted to better receive a cup being positioned in a cup holder equipped with the cup holder retainer.

In another possible embodiment, the preloaded retainer clip includes a median edge between the first and second ends and the integral biasing element also extends between the median edge and the support frame. In still another possible embodiment, the preloaded retainer clip includes a first end, a second end and a median edge between the first and second ends and the living hinge is provided at the first end and the integral biasing element extends between the median edge and the support frame.

In another possible embodiment, the cup holder retainer includes a second preloaded retainer clip that is connected to the support frame by a second living hinge and a second integral biasing element that biases the second preloaded retainer clip into a second cup-engaging position. In still another embodiment, the cup holder retainer includes a third preloaded retainer clip connected to the support frame by a third living hinge and a third integral biasing element that biases the third preloaded retainer clip into a third cup-engaging position.

In any of these embodiments, it should be appreciated that the living hinge functions as a pivot axis for the associated preloaded retainer clip.

In accordance with an additional aspect, a cup holder assembly is provided. That cup holder assembly comprises a cup holder body including a cup well having a sidewall including a slot and a cup holder retainer as described herein. A preloaded retainer clip of the cup holder retainer projects through the slot into the cup well.

In accordance with still another aspect, a method of producing a cup holder retainer with an integral preload for gripping the cup is provided. That method includes molding the cup holder retainer with (a) a unitary support frame and retainer clip, wherein the retainer clip is connected to the support frame by a living hinge forming a rotation axis for the retainer clip, and (b) an integral biasing element providing a preload.

In one possible embodiment, the method includes molding the cup holder retainer from acetal homopolymer. Further, the method may include providing the living hinge at a first end of the retainer clip and providing the integral biasing element at a second end of the retainer clip where the first end is opposite the second end.

In the following description, there are shown and described several preferred embodiments of the cup holder retainer. As it should be realized, the cup holder retainer is capable of other, different embodiments and its several details are capable of modification in various, obvious aspects all without departing from the cup holder retainer as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cup holder retainer and together with the description serve to explain certain principles thereof. In the drawing figures:

FIG. 3 is a cross-sectional view of the embodiment illustrated in FIGS. 1 and 2 showing the retainer clip in the home position in phantom line and a fully retracted position in full line.

FIG. 4 is a detailed front elevational view of a second possible embodiment of the cup holder retainer.

Reference will now be made in detail to the present preferred embodiments of the cup holder retainer and cup holder assembly, examples of which are illustrated in the accompanying drawing figures.

DETAILED DESCRIPTION

Figure 1:
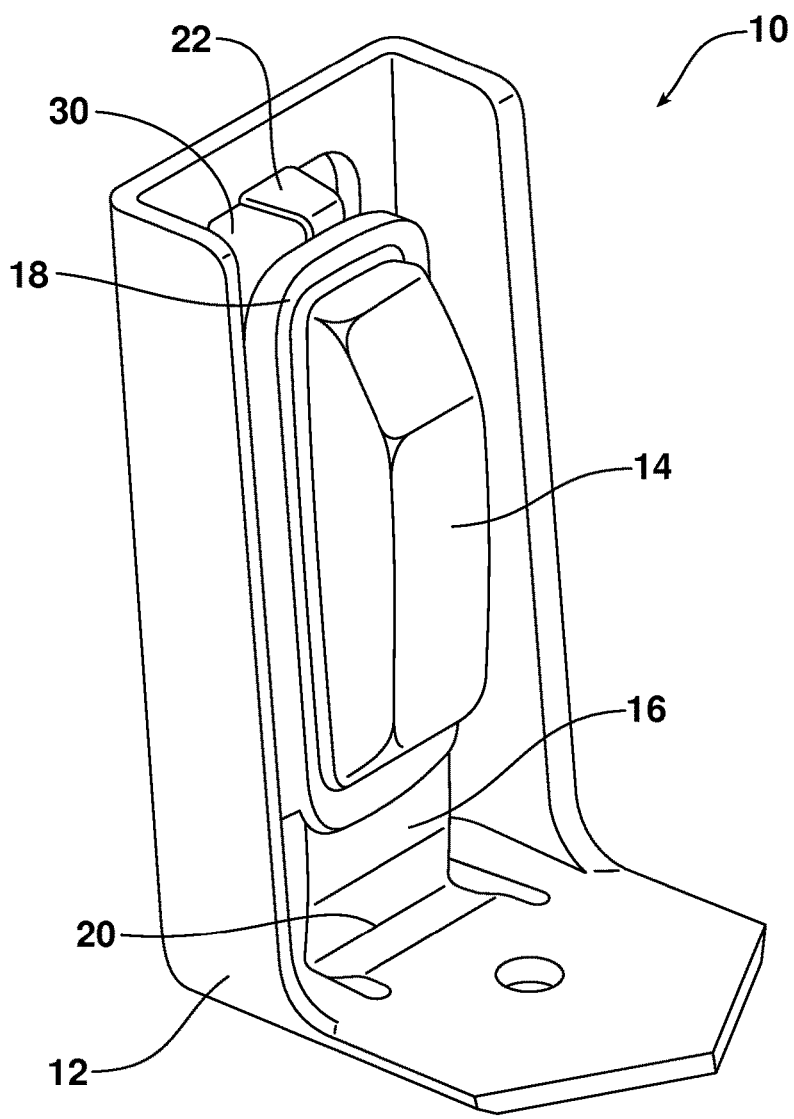
FIG. 1 is a detailed perspective view of a cup holder retainer incorporating a support frame and a single preloaded retainer clip which is shown in the home position.
Figure 2:
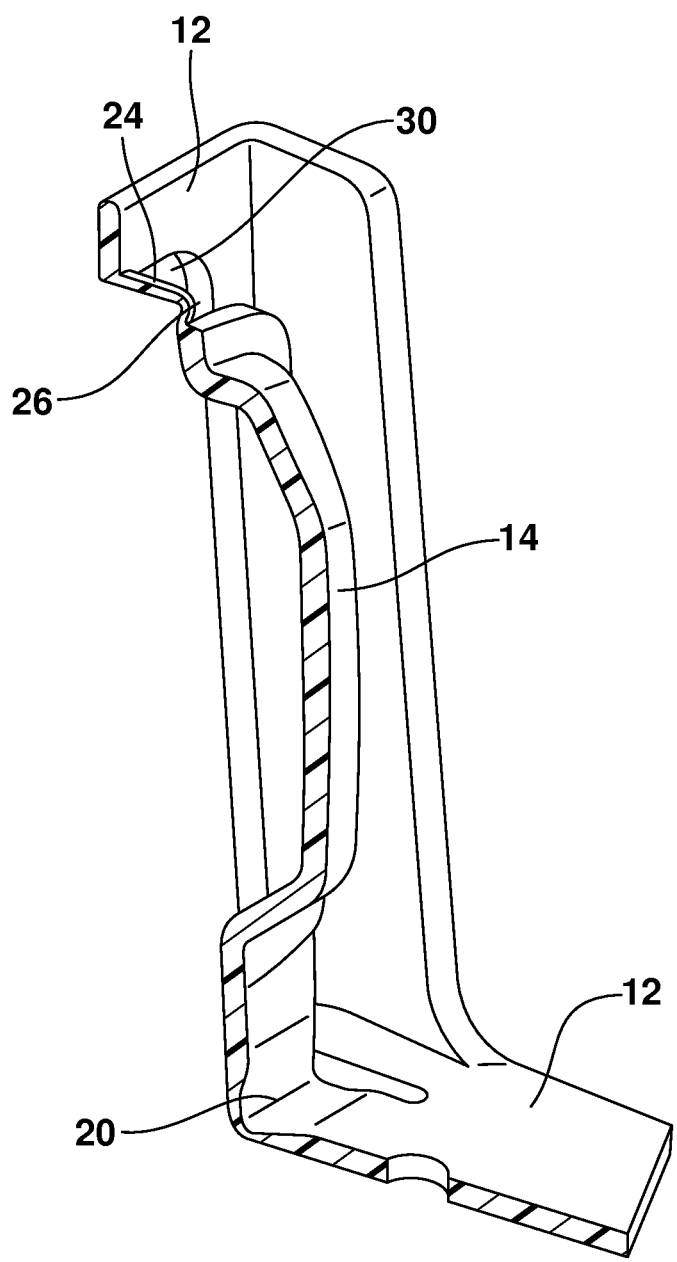
FIG. 2 is a perspective cross-sectional view of the cup holder retainer illustrated in FIG. 1.

Reference is now made to FIGS. 1-3 illustrating a first embodiment of the cup holder retainer 10. The cup holder retainer 10 includes a support frame 12 and a preloaded retainer clip 14 which form a unitary body.

As illustrated, the preloaded retainer clip 14 includes a first end 16 and a second end 18 defining a longitudinal axis. The preloaded retainer clip 14 is connected to the support frame by a living hinge 20 at the first end 16 and an integral biasing element 22 at the second end 18. As will become apparent in the following description, the living hinge 20 functions as a rotation axis for the preloaded retainer clip 14 with respect to the support frame 12 while the integral biasing element 22 functions to bias the preloaded retainer clip into a home or cup-engaging position.

In one possible embodiment, the cup holder retainer 10 is molded from acetal homopolymer as a single piece or unitary body. This material provides the desired combination of creep resistance, flexural fatigue and impact strength to form the living hinge 20 and provide the desired resilience for the integral biasing element 22.

As illustrated in FIGS. 1 and 2, the integral biasing element 22 may be formed or molded with an L-shape. As shown, the L-shaped integral biasing element 22 includes a first leg 24 and a second leg 26 wherein the first leg 24 is longer than the second leg 26. As illustrated, the distal end of the first leg 24 is connected to the support frame 12 while the distal end of the second leg 26 is connected to the preloaded retainer clip 14.

Reference is now made to FIG. 3 illustrating the operation of the preloaded retainer clip 14. Under normal or static conditions, the integral biasing element 22 functions to bias the preloaded retainer clip 14 into the preloaded or home position illustrated in phantom line. However, when a cup is pushed downwardly in the direction of action arrow B across the beveled face 28 of the preloaded retainer clip 14, the retainer clip pivots or rotates about the living hinge 20 and is deflected outwardly in the direction of action arrow C through the cooperating aperture 30 formed in the support frame 12 toward the fully deflected or cup-receiving position illustrated in full line. As this occurs, the integral biasing element 22 is deformed from its normal L-shape. However, as the integral biasing element 22 remains connected between the first end 16 of the retainer clip 14 and the support frame 12 at the top of the aperture 30, the integral biasing element 22 functions to limit the pivot angle deflection of the retainer clip. The resilient memory of the material from which the cup holder retainer 10 is formed also results in the integral biasing element 22 seeking to return to its original L-shape, thereby biasing the preloaded retainer clip 14 to return in the direction of action arrow D back toward the home or phantom line position. Thus, the face 32 of the retainer clip is always biased inwardly into a cup-engaging position.

Reference is now made to FIG. 4 illustrating an alternative embodiment of the cup holder retainer 10. The alternative embodiment of the cup holder retainer 10 illustrated in FIG. 4 essentially corresponds structurally to the embodiment illustrated in FIGS. 1-3 and, accordingly, like reference numbers are utilized to identify like components. The embodiment of the cup holder retainer 10 illustrated in FIG. 4 differs from that illustrated from the embodiment of FIGS. 1-3 by including additional integral biasing elements 40 that extend from a median edge 42 at each side of the preloaded retainer clip 14 to the support frame 12 at the side margins of the opening 30. Thus, as should be appreciated, this embodiment includes the integral biasing elements 22 and 40 at the first end 16 and median edges 42 of the cup holder retainer 14. Here it should be noted that the cup holder retainer 10 may assume the form of yet another embodiment having only integral biasing elements 40 on the median edges 42 of the retainer clip: that is, the integral biasing element 22 at the first end 16 is absent.

Figure 5:
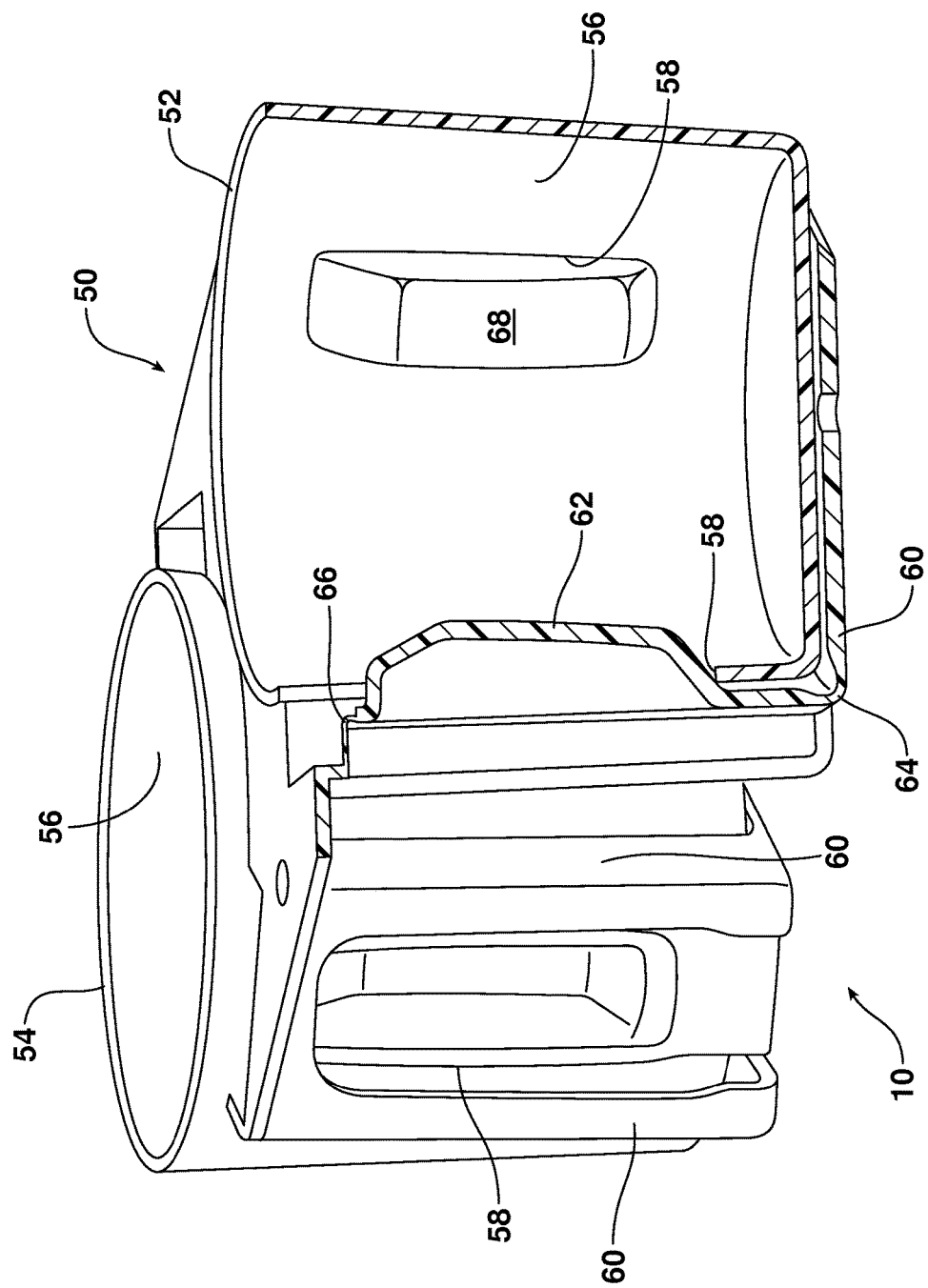
FIG. 5 is a detailed perspective and partially cross-sectional view of a cup holder assembly incorporating multiple cup holder retainers as illustrated in FIGS. 1-3.
Figure 7:
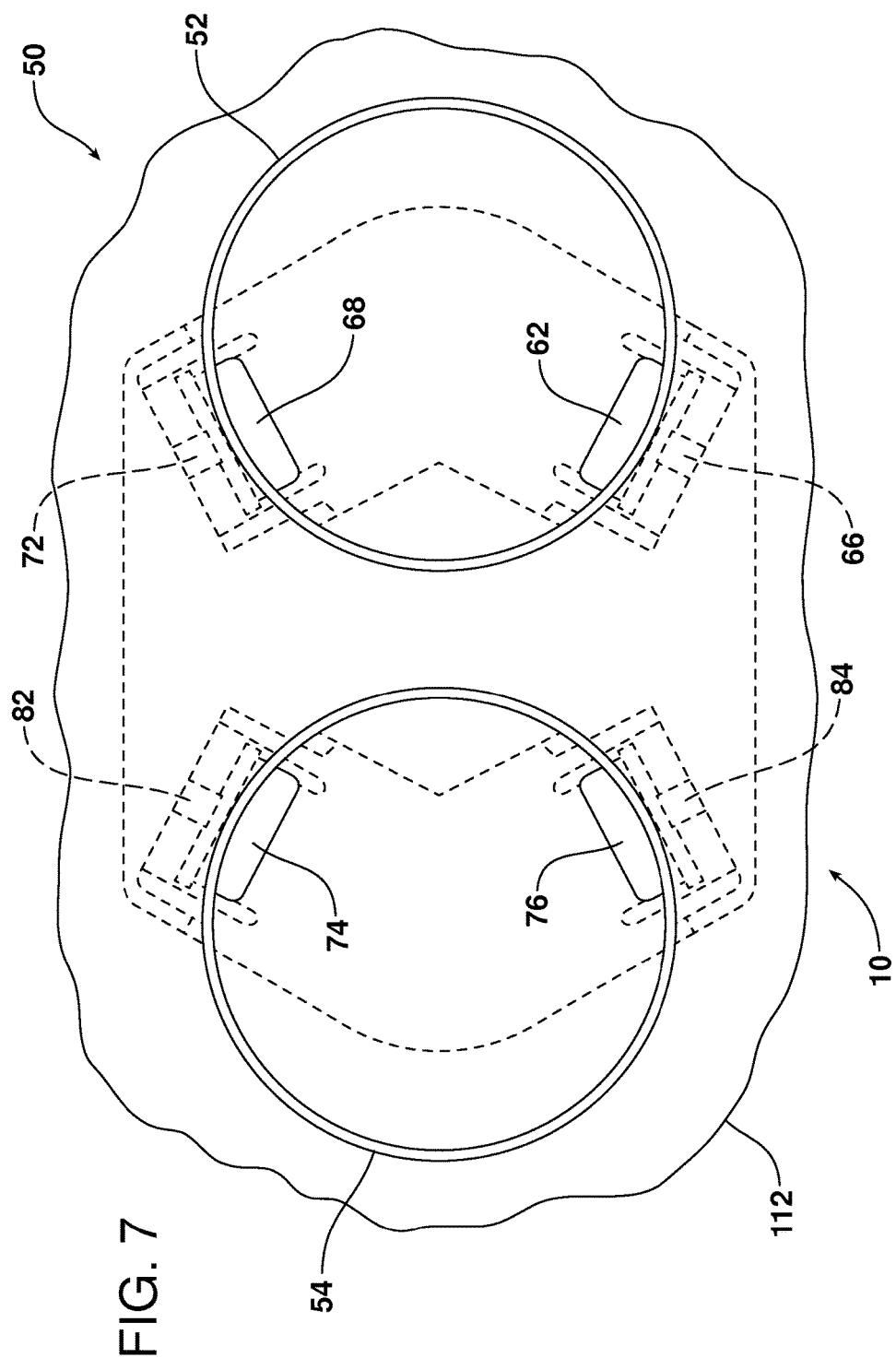
FIG. 7 is a top plan view of a cup holder assembly as received and held in a center console of a motor vehicle.

Reference is now made to FIGS. 5 and 7 illustrating a cup holder assembly 50 having a cup holder body including two cup wells 52, 54. As illustrated, the cup wells 52, 54 are positioned downwardly and received within the support frame 60 of yet another embodiment of the cup holder retainer 10. In the illustrated embodiment, the cup holder retainer 10 includes a first preloaded retainer clip 62 connected to the support frame 60 by a first living hinge 64 and a first integral biasing element 66. The cup holder retainer 10 also includes a second preloaded retainer clip 68 spaced about 120° from the first clip 62 and connected by a second living hinge (hidden from view) and second integral biasing element 72 to the support frame 60. Together, the first and second retainer clips 62 and 68 extend through cooperating slots 58 in the sidewall 56 of the first cup well 52 and function together to positively hold any cup received in that cup well in the manner previously described.

As further illustrated in FIGS. 5 and 7, the cup holder retainer 10 includes third and fourth preloaded retainer clips 74, 76 connected to the support frame by respective third and fourth living hinges (hidden from view) and third and fourth integral biasing elements 82, 84. The third and fourth retainer clips 74, 76 extend into the slots 58 in the sidewalls 56 of the second cup well 54 and function together to retain a cup in that cup well. FIG. 7 illustrates the cup holder assembly 50 in the center console 112 of a motor vehicle.

Figure 6:
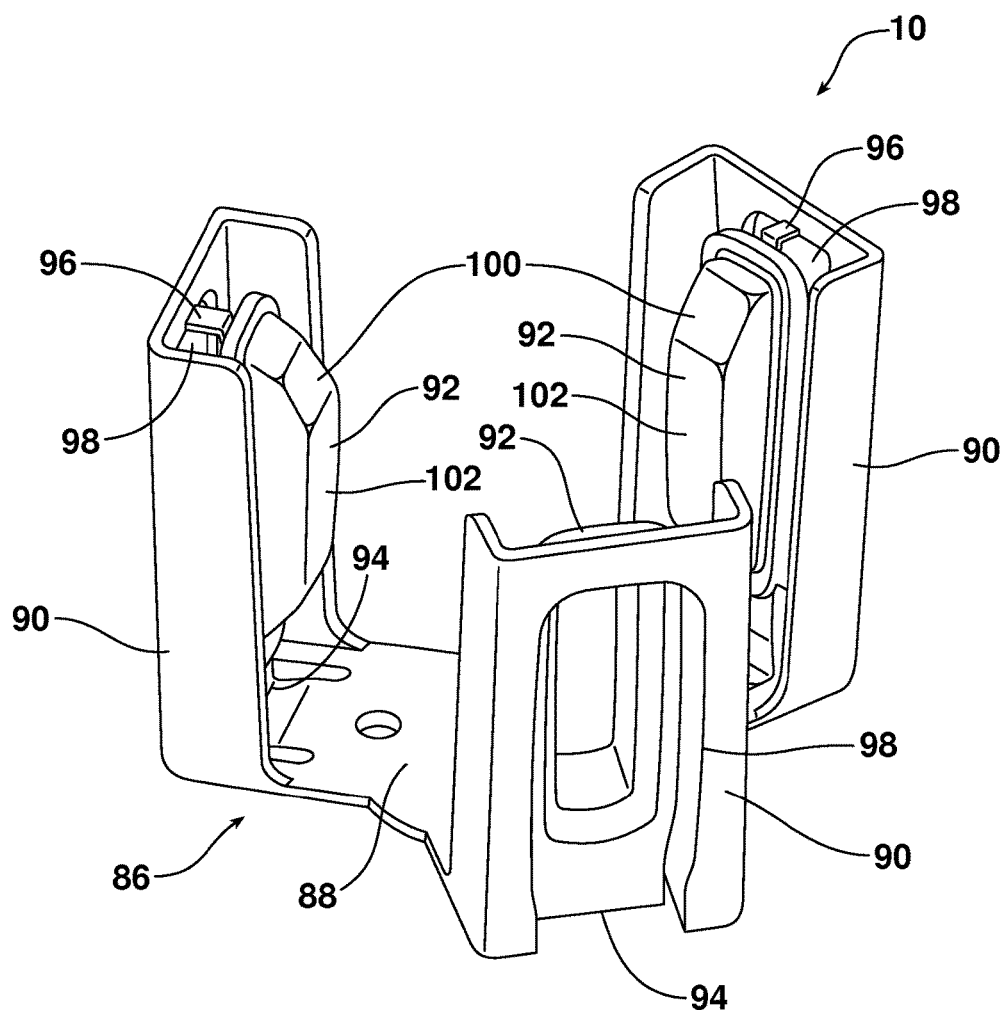
FIG. 6 is a perspective view of still another possible embodiment of cup holder retainer.

Reference is now made to FIG. 6 illustrating yet another embodiment of the cup holder retainer 10. This embodiment of the cup holder retainer 10 includes a support frame 86 including a bottom wall 88 and three upstanding posts 90 oriented about 120° apart.

The cup holder retainer 10 also includes first, second and third retaining clips 92 with one retaining clip received on each post 90. Each retaining clip 92 is connected to its associated post at the bottom end by a living hinge 94 (only two visible in the figure) and at the top by an integral biasing element 96.

When a cup is pushed down into the cup holder retainer 10 illustrated in FIG. 6, the lower edge of the cup engages the beveled face 100 of the clips 92 and the clips are deflected outwardly against the biasing force of the integral biasing elements 96 into the apertures 98 of the posts 90. At all times, the integral biasing elements 96 function to bias the retaining clips 92 inwardly so that the gripping faces 102 of the clips 92 are preloaded toward a cup-engaging position thereby securely holding the cup in position.

A method of producing a cup holder retainer 10 with an integral preload for gripping a cup is also described herein. That method includes the step of molding the cup holder retainer 10 with a unitary support frame 12 and retainer clip 14 wherein the retainer clip is connected to the support frame by a living hinge 20, forming a rotation axis for the retainer clip, and an integral biasing element 22 providing the preload. That molding may be completed using acetal homopolymer. Further, the method may include providing the living hinge 20 at a first end 16 of the retainer clip 14 and providing the integral biasing element 22 at the second, opposite end 18.

In summary, the cup holder retainer 10 described herein is characterized by a number of distinct benefits and advantages. Any embodiment of the cup holder retainer 10 described herein may be simply and economically produced by molding from a single material such as acetal homopolymer. The resulting unitary body incorporates an integral biasing element 22, thereby eliminating the need for separate springs or elastic biasing elements commonly associated with cup holders of prior art design. This reduction in parts further reduces complexity and manufacturing costs while enhancing reliable operating performance over a long service life. Thus, the cup holder retainer 10 represents a significant advance in the art.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A cup holder assembly, comprising:
   a cup holder body, including a cup well having a sidewall including a slot; and
   a cup holder retainer including: (i) a support frame; (ii) a preloaded retainer clip connected to said support frame by a living hinge; and (iii) a substantially L-shaped integral biasing element, said biasing element biasing said preloaded retainer clip into a cup-engaging position, wherein said preloaded retainer clip projects through said slot into said cup well.

2. The cup holder assembly of claim 1, wherein said support frame and said preloaded retainer clip are part of a unitary body.

3. The cup holder assembly of claim 2, wherein said body is made from acetal homopolymer.

4. The cup holder assembly of claim 2, wherein said preloaded retainer clip includes a longitudinal axis extending from said living hinge at a first end to said integral biasing element at a second end.

5. The cup holder assembly of claim 4, wherein said integral biasing element has a first leg and a second leg wherein said first leg is longer than said second leg.

6. The cup holder assembly of claim 5, wherein said first leg is connected to said support frame and said second leg is connected to said preloaded retainer clip.

7. The cup holder assembly of claim 6, wherein said preloaded retainer clip includes a beveled face.

8. The cup holder assembly of claim 6, wherein said living hinge functions as a rotation axis for said preloaded retainer clip.

* * * * *